(12) United States Patent
Shirinfar et al.

(10) Patent No.: US 10,879,944 B2
(45) Date of Patent: *Dec. 29, 2020

(54) OUTPHASING-CALIBRATION IN A RADIO FREQUENCY (RF) TRANSMITTER DEVICE

(71) Applicant: Movandi Corporation, Irvine, CA (US)

(72) Inventors: Farid Shirinfar, Granada Hills, CA (US); Ahmadreza Rofougaran, Newport Beach, CA (US); Sam Gharavi, Irvine, CA (US); Kartik Sridharan, San Diego, CA (US); Michael Boers, South Turramurra (AU); Seunghwan Yoon, Irvine, CA (US); Donghyup Shin, Irvine, CA (US); Stephen Wu, Fountain Valley, CA (US); Maryam Rofougaran, Rancho Palos Verdes, CA (US)

(73) Assignee: MOVANDI CORPORATION, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/684,789

(22) Filed: Nov. 15, 2019

(65) Prior Publication Data

US 2020/0083916 A1 Mar. 12, 2020

Related U.S. Application Data

(63) Continuation of application No. 16/206,450, filed on Nov. 30, 2018, now Pat. No. 10,530,401, which is a (Continued)

(51) Int. Cl.
*H04B 1/04* (2006.01)
*H04B 17/12* (2015.01)

(52) U.S. Cl.
CPC ............ *H04B 1/0475* (2013.01); *H04B 17/12* (2015.01); *H04B 2001/0416* (2013.01)

(58) Field of Classification Search
CPC .................... H04B 1/0475; H04B 2001/0416
See application file for complete search history.

(56) References Cited

U.S. PATENT DOCUMENTS 3,835,469 A 9/1974 Chen et al.
5,479,651 A 12/1995 Nakaguchi
(Continued)

OTHER PUBLICATIONS

Moloudi, et al., The Outphasing RF Power Amplifier: A Comprehensive Analysis and a Class-B CMOS Realization, IEEE Journal of Solid-State Circuits, pp. 1357-1369, vol. 48, No. 6, Jun. 2013.
(Continued)

*Primary Examiner* — Jean B Corrielus
(74) *Attorney, Agent, or Firm* — Chip Law Group

(57) ABSTRACT

An outphasing calibration method in an outphasing calibration RF transmitter comprises detection of differences of a first plurality of signal characteristics of a first plurality of amplified RF signals across at least a transmitter antenna and a plurality of load impedances. The first plurality of amplified RF signals corresponds to a first plurality of constant-envelope signals. Accordingly, at least a generation of a second plurality of constant-envelope signals and at least one signal characteristic of each of a second plurality of constant-envelope RF signals on a plurality of transmission paths are controlled. At least one of a first calibration or a second calibration of a second plurality of signal characteristics of the second plurality of constant-envelope signals is executed based on the controlled generation of the second plurality of constant-envelope signals and the at least one controlled signal characteristic of each of the second plurality of constant-envelope RF signals.

22 Claims, 5 Drawing Sheets

Related U.S. Application Data continuation of application No. 15/847,367, filed on Dec. 19, 2017, now Pat. No. 10,171,115.

(56) References Cited

U.S. PATENT DOCUMENTS

| | | | |
|---|---|---|---|
| 5,883,602 | A | 3/1999 | Volman |
| 7,729,445 | B2 | 6/2010 | Ravi et al. |
| 8,290,086 | B2 | 10/2012 | Bose et al. |
| 9,137,067 | B1* | 9/2015 | Xie ............... H04L 27/20 |
| 9,197,465 | B2 | 11/2015 | Ma et al. |
| 9,742,367 | B2 | 8/2017 | Mirzaei et al. |
| 10,103,853 | B2 | 10/2018 | Moshfeghi |
| 10,199,717 | B2 | 2/2019 | Rofougaran et al. |
| 2007/0115800 | A1 | 5/2007 | Fonseka et al. |
| 2009/0175214 | A1 | 7/2009 | Sfar et al. |
| 2010/0074367 | A1 | 3/2010 | Kim et al. |
| 2010/0265925 | A1 | 10/2010 | Liu et al. |
| 2013/0039342 | A1 | 2/2013 | Kazmi |
| 2014/0079165 | A1 | 3/2014 | Kludt et al. |
| 2014/0104124 | A1 | 4/2014 | Chernokalov et al. |
| 2015/0222230 | A1* | 8/2015 | Tajima ............... H03F 3/19 330/124 R |
| 2015/0296344 | A1 | 10/2015 | Trojer et al. |
| 2016/0285474 | A1* | 9/2016 | Miyamae ........... H03M 13/611 |
| 2017/0062944 | A1 | 3/2017 | Zimmerman et al. |
| 2018/0063139 | A1 | 3/2018 | Day et al. |
| 2018/0109303 | A1 | 4/2018 | Yoo et al. |
| 2018/0176799 | A1 | 6/2018 | Lange et al. |
| 2018/0183152 | A1 | 6/2018 | Turpin et al. |
| 2019/0123866 | A1 | 4/2019 | Moshfeghi |
| 2020/0076491 | A1 | 3/2020 | Zhang et al. |
| 2020/0145079 | A1 | 5/2020 | Marinier et al. |

OTHER PUBLICATIONS

Non-Final Office Action in U.S. Appl. No. 15/924,551 dated Jun. 13, 2018.
Notice of Allowance for U.S. Appl. No. 16/206,450 dated Sep. 5, 2019.
Notice of Allowance in U.S. Appl. No. 15/655,255 dated Nov. 27, 2017.
Notice of Allowance in U.S. Appl. No. 15/847,367 dated Aug. 29, 2018.
Notice of Allowance in U.S. Appl. No. 15/924,551 dated Nov. 6, 2018.
Zhao, et al., A 60-GHz Outphasing Transmitter in 40-nm CMOS, IEEE Journal of Solid-State Circuits, pp. 3172-3183, vol. 47, No. 12, Dec. 2012.
Corrected Notice of Allowance for U.S Appl. No. 16/526,544 dated Aug. 25, 2020.
Non-Final Office Action for U.S. Appl. No. 16/451,998 dated Sep. 11, 2020.
Non-Final Office Action for U.S. Appl. No. 16/452,023 dated Sep. 9, 2020.
Non-Final Office Action for U.S. Appl. No. 16/866,536 dated Sep. 1, 2020.
Corrected Notice of Allowability for U.S. Appl. No. 15/256,222 dated Jul. 10, 2020.
Corrected Notice of Allowability for U.S. Appl. No. 16/377,980 dated Jul. 22, 2020.
Corrected Notice of Allowability for U.S. Appl. No. 16/526,544 dated Jul. 16, 2020.
Final Office Action for U.S. Appl. No. 16/125,757 dated Jul. 15, 2020.
Final Office Action for U.S. Appl. No. 16/377,847 dated Jul. 13, 2020.
Final Office Action for U.S. Appl. No. 16/666,680 dated Jun. 29, 2020.
Non-Final Office Action for U.S. Appl. No. 16/388,043 dated Aug. 3, 2020.
Non-Final Office Action for U.S. Appl. No. 16/819,388 dated Jul. 2, 2020.
Notice of Allowance for U.S. Appl. No. 16/129,413 dated Aug. 12, 2020.
Notice of Allowance for U.S. Appl. No. 16/153,735 dated Jul. 2, 2020.
Notice of Allowance for U.S. Appl. No. 16/684,789 dated Jul. 10, 2020.
Supplemental Notice of Allowability for U.S. Appl. No. 16/153,735 dated Jul. 22, 2020.
Supplemental Notice of Allowance for U.S. Appl. No. 16/231,903 dated Jul. 1, 2020.
Corrected Notice of Allowance for U.S. Appl. No. 16/377,980 dated Oct. 5, 2020.
Corrected Notice of Allowance for U.S. Appl. No. 15/836,198 dated Oct. 2, 2020.
Corrected Notice of Allowance for U.S. Appl. No. 16/526,544 dated Sep. 25, 2020.
Final Office Action for U.S. Appl. No. 16/364,956 dated Oct. 2, 2020.
Non-Final Office Action for U.S. Appl. No. 16/204,397 dated Sep. 17, 2020.
Non-Final Office Action for U.S. Appl. No. 16/451,980 dated Sep. 21, 2020.
Non-Final Office Action for U.S. Appl. No. 16/689,758 dated Sep. 29, 2020.
Corrected Notice of Allowance for U.S. Appl. No. 15/256,222 dated Oct. 28, 2020.
Non-Final Office Action for U.S. Appl. No. 16/233,044 dated Oct. 14, 2020.
Non-Final Office Action for U.S. Appl. No. 16/398,156 dated Oct. 15, 2020.
Non-Final Office Action for U.S. Appl. No. 16/666,680 dated Nov. 13, 2020.
Non-Final Office Action for U.S. Appl. No. 16/941,690 dated Nov. 12, 2020.
Notice of Allowability for U.S. Appl. No. 16/129,413 dated Nov. 9, 2020.
Notice of Allowability for U.S. Appl. No. 16/125,757 dated Oct. 28, 2020.
Notice of Allowability for U.S. Appl. No. 16/388,043 dated Nov. 5, 2020.
Supplemental Notice of Allowance for U.S. Appl. No. 16/153,735 dated Oct. 9, 2020.
Notice of Allowance for U.S. Appl. No. 16/927,470 dated Oct. 29, 2020.

\* cited by examiner

OUTPHASING-CALIBRATION IN A RADIO FREQUENCY (RF) TRANSMITTER DEVICE

CROSS-REFERENCE TO RELATED APPLICATIONS/INCORPORATION BY REFERENCE

This Patent Application makes reference to, claims priority to, claims the benefit of, and is a Continuation Application of U.S. patent application Ser. No. 16/206,450, which was filed on Nov. 30, 2018, entitled "Outphasing-Calibration in a Radio Frequency (RF) Transmitter Device" which is a Continuation Application of U.S. Pat. No. 10,171,115, which was filed on Dec. 19, 2017, entitled "Outphasing Calibration in a radio Frequency (RF) Transmitter Device". This Patent Application makes reference to U.S. Pat. No. 10,298,275, which was filed on Feb. 14, 2017, entitled "Outphasing Transmit and Receive Wireless System Having Dual-Polarized Antennas," and U.S. Pat. No. 9,935,663 which was filed on Jul. 20, 2017, entitled "Low-Loss Isolating Outphasing Power Combiner in a Radio Frequency Device."

Each of the above referenced Applications is hereby incorporated herein by reference in its entirety.

FIELD OF TECHNOLOGY

Certain embodiments of the disclosure relate to outphasing wireless systems. More specifically, certain embodiments of the disclosure relate to outphasing calibration in an RF transmitter device.

BACKGROUND

Currently, wireless communication is extensively utilized in various fields of applications, such as in homes, public places, or office areas. Consequently, there is a huge demand for high data-rate and bandwidth-efficient wireless transmission standards, such as 802.11 Wireless LAN, cellular LTE, and 5G. Accordingly, various concepts, such as linear amplification using nonlinear components (LINC) (also known as outphasing), are being used for highly efficient linear power amplification of wireless signals, for example RF signals.

Typically, in an outphasing transmit wireless system, an RF signal with varying amplitude (also referred to as "variable-envelope signal") may be decomposed into two (or more) components with constant amplitude and different phases (also referred to as "constant-envelope signals"). Such constant envelope signals may be amplified by power amplifiers in an RF transmitter. The two amplified constant-envelope signals may be combined and transmitted by the RF transmitter, via a multi-antenna array, to an RF receiver.

In certain instances, there may be gain and/or phase mismatches between the two decomposed signals. Consequently, the linearity of the power amplifiers may be reduced and hence, may increase the error vector magnitude (EVM) of the RF signal. Further, such mismatch in gain and/or phase may result in IQ imbalance of the RF signal, thus deteriorating the signal quality. Thus, there is required an outphasing calibration that overcomes these deficiencies.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

A method and system is provided for an outphasing calibration in an RF transmitter device, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Certain embodiments of the disclosure may be found in a system for an outphasing calibration RF transmitter device. In the following description, reference is made to the accompanying drawings, which form a part hereof, and in which is shown, by way of illustration, various embodiments of the present disclosure.

Figure 1A:
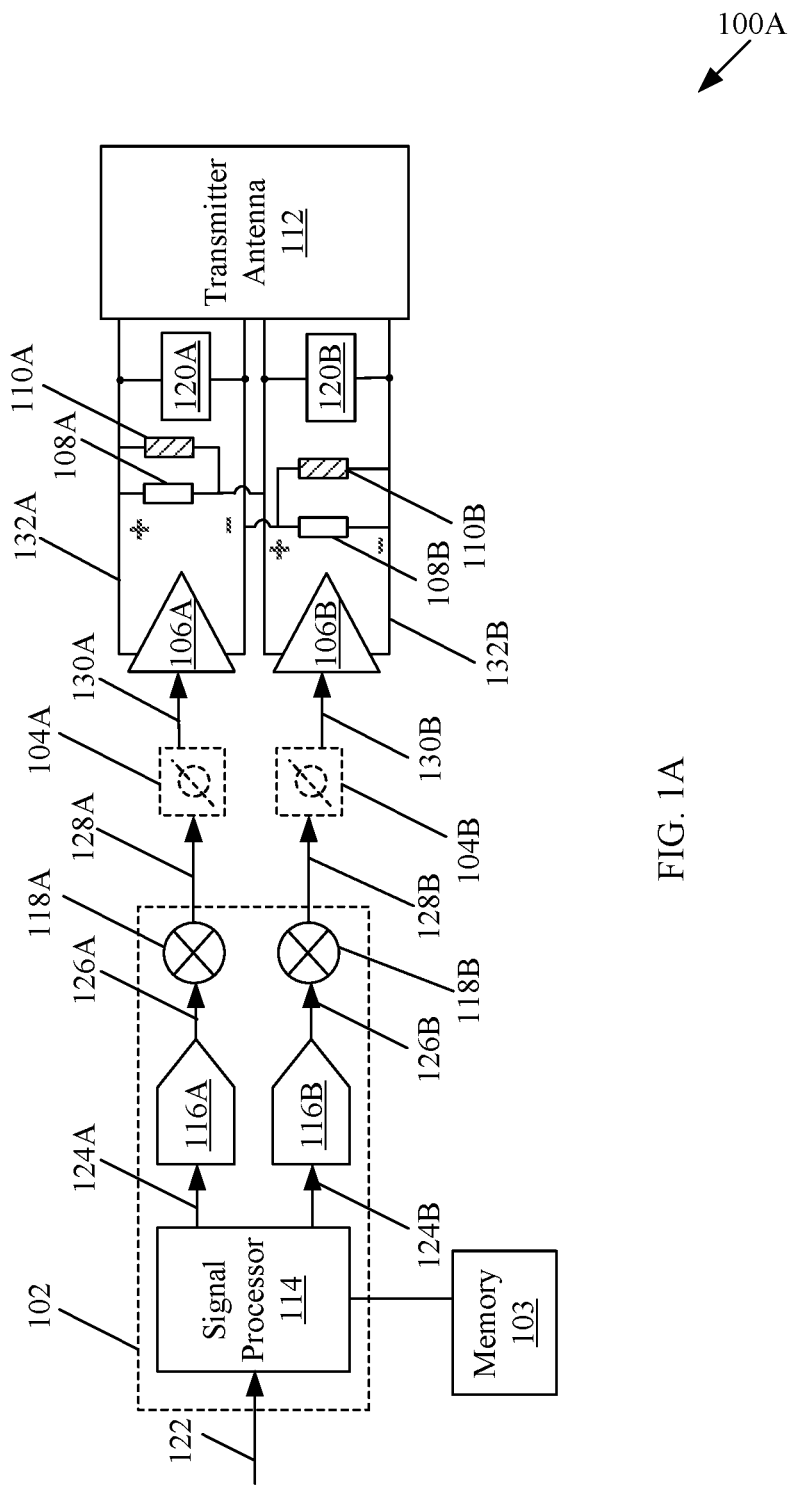
FIG. 1A illustrates an exemplary wireless system diagram of an exemplary outphasing calibration RF transmitter for a first modulated signal, in accordance with an exemplary embodiment of the disclosure.

FIG. 1A illustrates an exemplary wireless system diagram of a portion of an exemplary outphasing calibration RF transmitter for a first modulated signal, in accordance with an exemplary embodiment of the disclosure. With reference to FIG. 1A, there is shown an outphasing calibration RF transmitter 100A that includes a signal decomposition block 102, a memory 103, a first phase shifter (PS) 104A (optional in FIG. 1A), a second PS 104B (optional in FIG. 1A), a first power amplifier (PA) 106A, a second PA 106B, a first load impedance 108A, a second load impedance 108B, a first phase detector (PD) 110A, a second PD 110B, and a transmitter antenna 112. The signal decomposition block 102 may further include a signal processor 114, a first digital-to-analog converter (DAC) 116A, a second DAC 116B, a first mixer 118A, a second mixer 118B, and a plurality of transmitter signal strength indicator (TSSI) units 120A and 120B. There is further shown a first modulated input signal 122, a first plurality of constant-envelope signals 124 (such as a first constant-envelope signal 124A and a second constant-envelope signal 124B), a first plurality of constant-envelope analog signals 126 (such as a first constant-envelope analog signal 126A and a second constant-envelope analog signal 126B), a first plurality of RF signals 128 (such as a first RF signal 128A and a second RF signal 128B), a first plurality of phase-shifted RF signals 130 (optional) (such as a first phase-shifted RF signal 130A and a second phase-shifted RF signal 130B), and a first plurality of amplified RF signals 132 (such as a first amplified RF signal 132A and a second amplified RF signal 132B).

In accordance with an embodiment, the signal decomposition block 102 may be coupled to the first PS 104A and the second PS 104B. The first PS 104A and the second PS 104B may be further coupled to the first PA 106A and the second PA 106B. In accordance with another embodiment, the signal decomposition block 102 may be directly coupled to the first PA 106A and the second PA 106B. The first PA 106A and the second PA 106B may be differentially coupled to the first load impedance 108A and the second load impedance 108B. Further, the first PD 110A and the second PD 110B may be differentially coupled to the first load impedance 108A and the second load impedance 108B, respectively. The transmitter antenna 112 may be differentially coupled across the first PA 106A and the second PA 106B.

In the signal decomposition block 102, the signal processor 114 is coupled to the first DAC 116A and the second DAC 116B. Further, the first DAC 116A and the second DAC 116B are coupled to the first mixer 118A and the second mixer 118B, respectively. It may be noted that the signal decomposition block 102 may further include additional signal conditioning circuitry, such as phase shifters and time delays in a phased array, without deviation from the scope of the disclosure.

With reference to FIG. 1A, a first modulated input signal 122 may be provided to the signal decomposition block 102. The first modulated input signal 122 is an amplitude and phase modulated signal that may be provided by, for example a modem (not shown). The first modulated input signal 122 is a variable amplitude signal, expressed in equation (1) below:

$$S_{in}(t) = A_M * \sin(\omega t + \varphi(t)) \quad (1)$$

where, $S_{in}(t)$ represents the first modulated input signal 122, $A_M$ is the peak value of A(t) that represents the time-varying amplitude, and $\varphi(t)$ represents outphasing angle.

The signal processor 114 in the signal decomposition block 102 may be configured to decompose the first modulated input signal 122 (with variable amplitude) into the first plurality of constant-envelope signals 124 on a plurality of transmission paths. The first plurality of constant-envelope signals 124 may have a single constant amplitude level. The signal processor 114 may be implemented, for example, using a field-programmable gate array (FPGA) or an application-specific integrated circuit (ASIC) chip. The signal processor 114 may feed the first constant-envelope signal 124A and the second constant-envelope signal 124B to the first DAC 116A and the second DAC 116B, respectively.

The first DAC 116A and the second DAC 116B may be configured to convert the first plurality of constant-envelope signals 124 into first plurality of constant-envelope analog signals 126. The first DAC 116A and the second DAC 116B may feed the first constant-envelope analog signal 126A and the second constant-envelope analog signal 126B of the first plurality of constant-envelope analog signals 126 to the first mixer 118A and the second mixer 118B, respectively.

The first mixer 118A and the second mixer 118B may be configured to up-convert the first plurality of constant-envelope analog signals 126 into the first plurality of RF signals 128. The first RF signal 128A and the second RF signal 128B of the first plurality of RF signals 128 are expressed in equations (2) and (3) below:

$$S_1(t) = A_M/2 * \sin(\omega t + \varphi(t) + \psi(t)) \quad (2)$$

$$S_2(t) = A_M/2 * \sin(\omega t + \varphi(t) - \psi(t)) \quad (3)$$

where $S_1(t)$ and $S_2(t)$ represent the first RF signal 128A and the second RF signal 128B, respectively, $A_M$ is the peak value of A(t) that represents the time-varying amplitude, and $\psi(t)$ represents arc cos(A(t)).

In accordance with an embodiment, the first mixer 118A and the second mixer 118B may feed the first RF signal 128A and the second RF signal 128B to the first PA 106A and the second PA 106B, respectively. In such a case, the conversion of the first modulated input signal 122 to the first plurality of amplified RF signals 132 is the first instance of signal conversion in the outphasing calibration RF transmitter 100A. Thus, the first PS 104A and the second PS 104B may not execute any phase-shifting of the first plurality of RF signals 128. In accordance with another embodiment, the first mixer 118A and the second mixer 118B may feed the first RF signal 128A and the second RF signal 128B to the first PS 104A and the second PS 104B, respectively. The first PS 104A and the second PS 104B may execute phase-shifting on the first plurality of RF signals 128 based on various external factors (such as system configuration or manual setting) and not on previous RF signals. Feedback from the first instance (corresponding to the first modulated input signal 122) may be provided to a component, such as a modem, based on which the first PS 104A and the second PS 104B are controlled. Accordingly, the first PS 104A and the second PS 104B may execute phase-shifting on next modulated signals, such as a second modulated input signal 140, as described in FIG. 1B.

The first PA 106A and the second PA 106B, with similar impedances, may be configured to amplify the first plurality of RF signals 128, and generate the first plurality of amplified RF signals 132. The first PA 106A and the second PA 106B may be placed sufficiently apart from each other and provided respective RF shields for minimization of inter-modulation or interference between the first PA 106A and the second PA 106B.

The first PA 106A and the second PA 106B, operating on the respective first RF signal 128A and the second RF signal 128B, exhibit more power efficiency and lower back off than a power amplifier that would have utilized to amplify the first modulated input signal 122 with variable amplitude. Further, the first PA 106A and the second PA 106B operating on the respective first RF signal 128A and second RF signal 128B, exhibit less non-linearity and introduce less distortion than a power amplifier that would have utilized to amplify the first modulated input signal 122 with variable amplitude. The first PA 106A and the second PA 106B may feed the first plurality of amplified RF signals 132 to a power combiner.

The power combiner may be configured to reconstruct a first output RF signal based on a combination of the first plurality of amplified RF signals 132, received from the first PA 106A and the second PA 106B. The combination may correspond to a sum (and a difference) of the first plurality of amplified RF signals 132. In accordance with an embodiment, the combination of the first plurality of amplified RF signals 132 is expressed in equation (4) below:

$$S_{out}(t) = S'_1(t) + S'_2(t) \quad (4)$$
$$= G\cos(\Psi(t))\sin(\omega t + \varphi(t))$$
$$= GA(t)\sin(\omega t + \varphi(t))$$

where $S_{out}(t)$ represents the first output RF signal, $S'_1$(t) represents the first amplified RF signal 132A, $S'_2(t)$ represents the second amplified RF signal 132B, and G represents gain of the amplification stages, i.e. the first PA 106A and the second PA 106B.

Figure 2A:
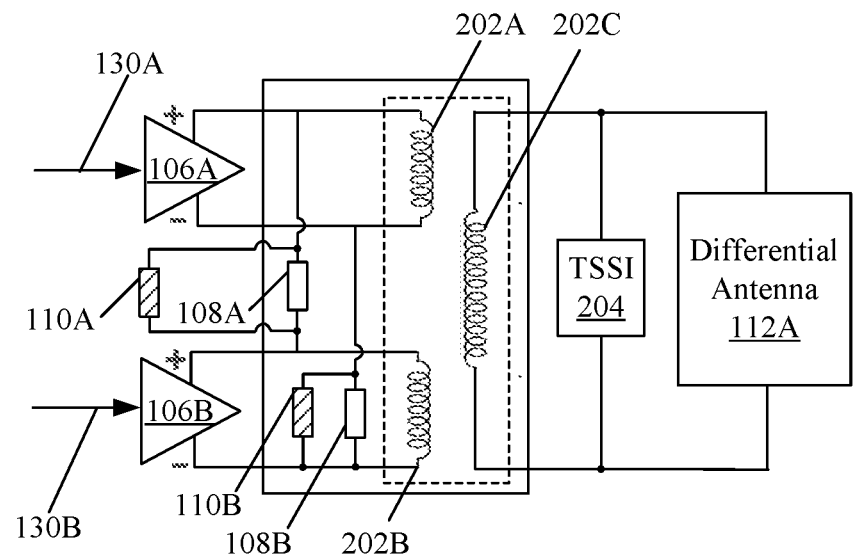
FIG. 2A illustrates a first exemplary embodiment of an outphasing calibration RF transmitter device.

The power combiner may be configured to match the impedances of the two PAs (i.e. the first PA 106A and the second PA 106B) and the transmitter antenna 112. For such impedance matching, the power combiner may utilize various components, such as load impedances and transformers. The primary coils in the transformers may be utilized to induce current in the secondary coils for certain currents, generated by two PAs based on the first plurality of amplified RF signals 132. Further, the load impedances may be utilized to dissipate other currents, generated by the two PAs based on the first plurality of amplified RF signals 132. Various embodiments of the power combiner have been described in detail in FIGS. 2A to 2D. For example, in accordance with an embodiment as illustrated in FIG. 2A, the primary coils in the transformers may be utilized to induce current in the secondary coils for in-phase currents, generated by two PAs based on the first plurality of amplified RF signals 132. In such a case, the load impedances may be utilized to dissipate out-phase currents, generated by two PAs. Accordingly, the voltage may be stabilized across the two PAs and the power efficiency of the outphasing calibration RF transmitter 100A may be enhanced.

Figure 2B:
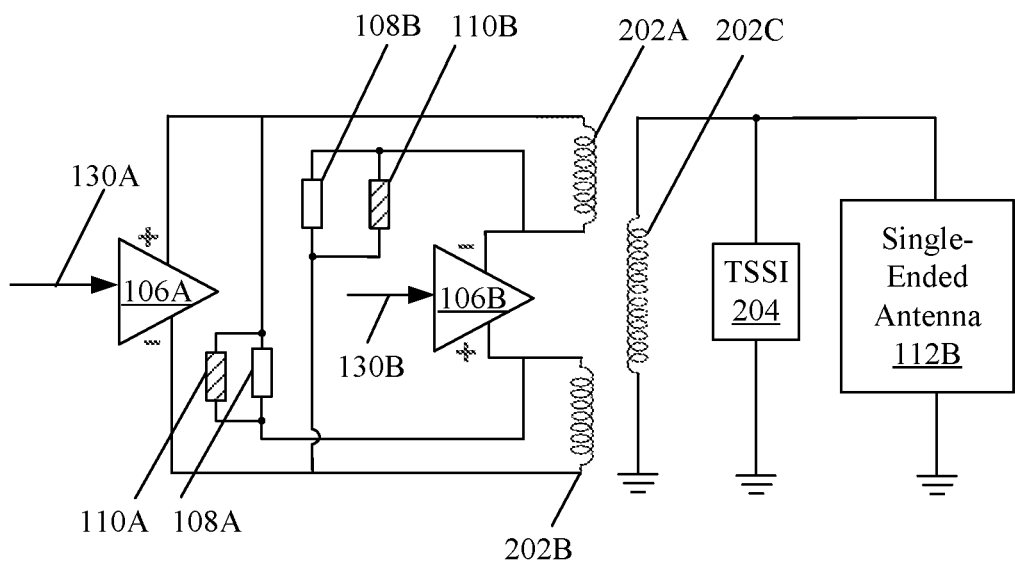
FIG. 2B illustrates a second exemplary embodiment of an outphasing calibration RF transmitter device.
Figure 2C:
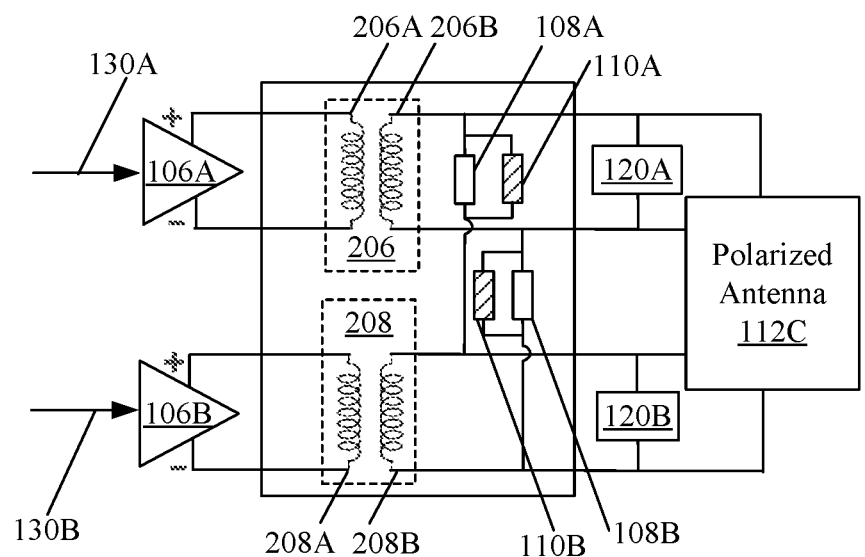
FIG. 2C illustrates a third exemplary embodiment of an outphasing calibration RF transmitter device.
Figure 2D:
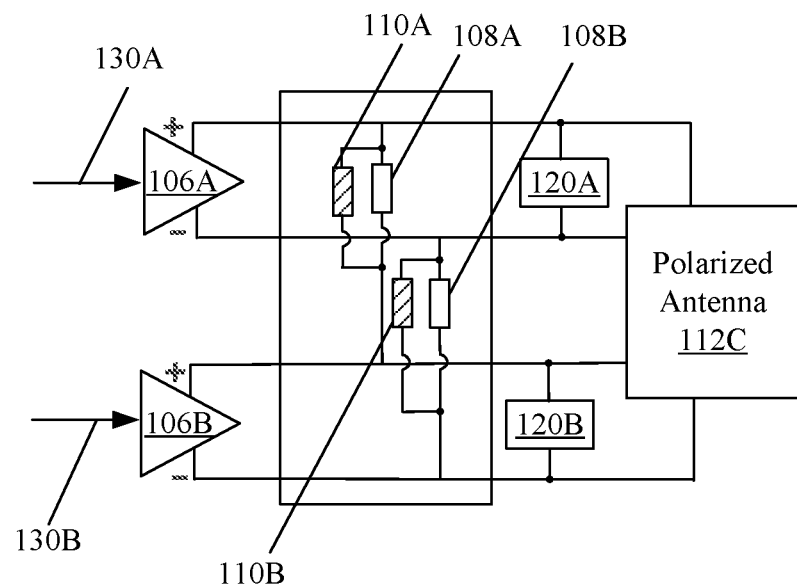
FIG. 2D illustrates a fourth exemplary embodiment of an outphasing calibration RF transmitter device.

The power combiner may feed the first output RF signal to the transmitter antenna 112. In accordance with various embodiments, the transmitter antenna 112 may be a differential antenna (as shown in FIG. 2A), a single-ended antenna (as shown in FIG. 2B), or a polarized antenna (as shown in FIGS. 2C and 2D). The polarized antenna, such as a dual-polarized patch antenna, a dual-polarized dipole antenna, or a dual-polarized slot antenna, may include a first pair of polarized ports (such as vertical ports) and a second pair of polarized ports (such as horizontal ports). One or more circuits in the polarized antenna may be configured to generate a first signal and a second signal based on the first plurality of amplified RF signals 132. The first signal may correspond to a sum of the first plurality of amplified RF signals 132. The second signal may correspond to a difference of the first plurality of amplified RF signals 132. The first pair of polarized ports and the second pair of polarized ports of the polarized antenna may be configured to transmit the first signal and the second signal to an outphasing RF receiver, via an RF communication network. Such an outphasing RF receiver may receive and process the first and the second signal, received from the outphasing calibration RF transmitter 100A.

In accordance with an embodiment, the first PD 110A and the second PD 110B, differentially coupled to the first load impedance 108A and the second load impedance 108B, may be configured to detect differences of a first signal characteristic, such as a phase difference, of the first plurality of amplified RF signals 132 across the first load impedance 108A and the second load impedance 108B. The first PD 110A and the second PD 110B may be configured to transmit the detected phase difference to a first controller (not shown), such as a phase controller, to control a phase difference of next modulated input signal, such as the second modulated input signal 140 (as shown in FIG. 1B).

In accordance with an embodiment, the first TSSI unit 120A may be differentially coupled to the first PA 106A and the second TSSI unit 120B may be differentially coupled to the second PA 106B. The TSSI units 120A and 120B may be configured to detect differences of a second signal characteristic, such as a voltage differences, of the first plurality of amplified RF signals 132 across the first PA 106A and the second PA 106B. The TSSI units 120A and 120B may be configured to transmit the detected voltage difference to a second controller (not shown), such as modem, to control a gain difference of next modulated input signal, such as the second modulated input signal 140 (as shown in FIG. 1B).

Figure 1B:
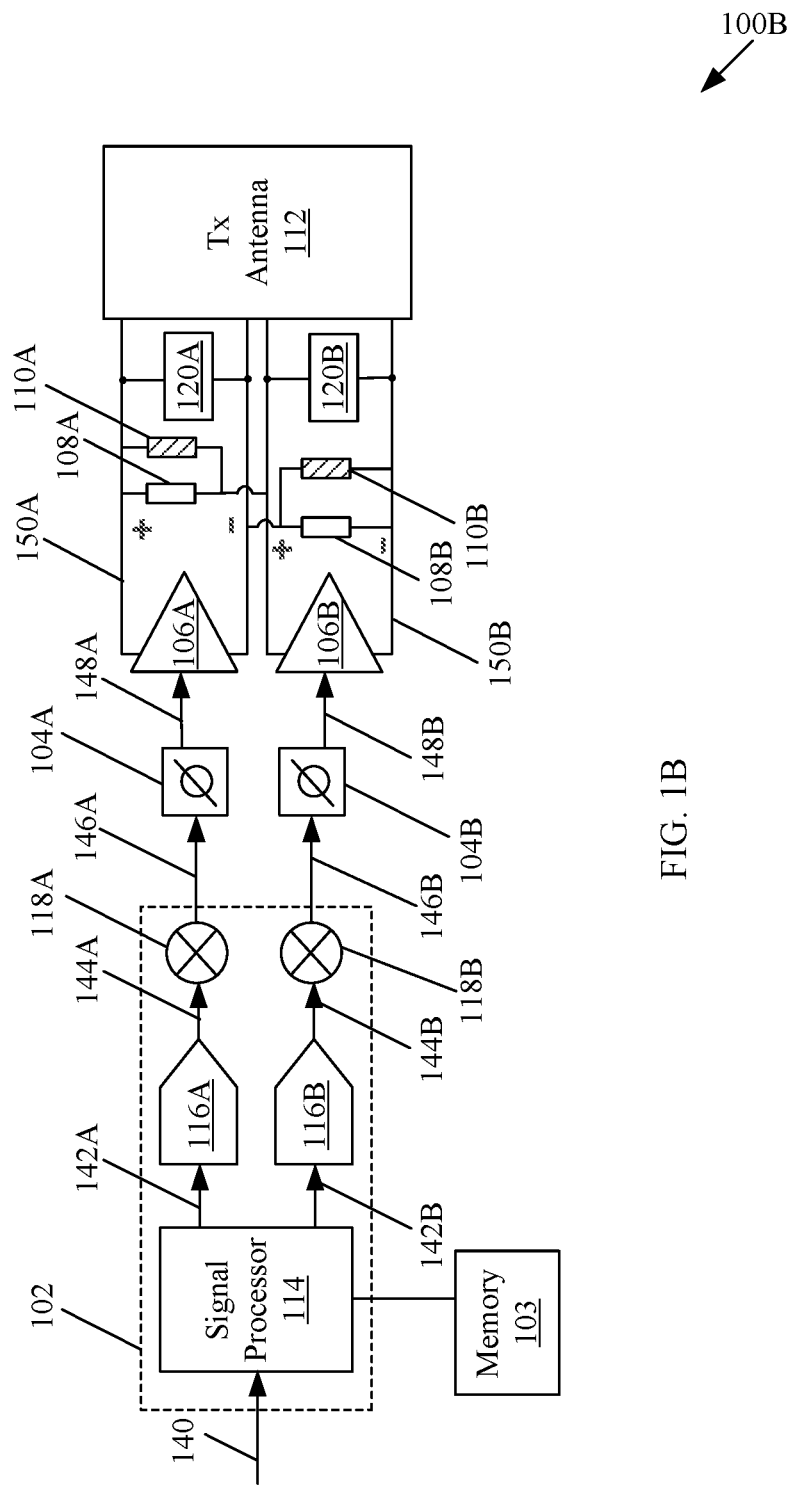
FIG. 1B illustrates an exemplary wireless system diagram of an exemplary outphasing calibration RF transmitter, as shown in FIG. 1A, for a second modulated signal, in accordance with an exemplary embodiment of the disclosure.

FIG. 1B illustrates an exemplary wireless system diagram of a portion of an exemplary outphasing calibration RF transmitter, as shown in FIG. 1A, for a second modulated signal, in accordance with an exemplary embodiment of the disclosure. With reference to FIG. 1B, there is shown the outphasing calibration RF transmitter 100B, as shown in FIG. 1A. Similar to the outphasing calibration RF transmitter 100A, the outphasing calibration RF transmitter 100B includes various components, such as the signal decomposition block 102, a memory 103, the first PS 104A, the second PS 104B, the first PA 106A, the second PA 106B, the first load impedance 108A, the second load impedance 108B, the first PD 110A, the second PD 110B, and the transmitter antenna 112. The signal decomposition block 102 may further include the signal processor 114, the first DAC 116A, the second DAC 116B, the first mixer 118A, and the second mixer 118B, and the plurality of TSSI units 120A and 120B.

There is further shown the second modulated input signal 140, a second plurality of constant-envelope signals 142 (such as a first constant-envelope signal 142A and a second constant-envelope signal 142B), a second plurality of constant-envelope analog signals 144 (such as a first constant-envelope analog signal 144A and a second constant-envelope analog signal 144B), a second plurality of RF signals 146 (such as a first RF signal 146A and a second RF signal 146B), a second plurality of phase-shifted RF signals 148 (such as a first phase-shifted RF signal 148A and a second phase-shifted RF signal 148B), and a second plurality of amplified RF signals 150 (such as a first amplified RF signal 150A and a second amplified RF signal 150B).

With reference to FIG. 1B, the second modulated input signal 140 may be provided to the signal decomposition block 102. The second modulated input signal 140 is an amplitude and phase modulated signal that may be provided by, for example a modem (not shown). The second modulated input signal 140 is a variable amplitude signal, expressed in equation (1), as described in FIG. 1A.

The signal processor 114 in the signal decomposition block 102 may further receive a feedback signal characteristic, such as a voltage difference, from the second controller. The voltage difference, corresponding to the first modulated input signal 122, is determined by the TSSI units 120A and 120B and provided to the second controller for calibration of a second plurality of signal characteristics, such as gain mismatch, that corresponds to the second plurality of constant-envelope signals 142. The second plurality of constant-envelope signals 142, thus generated by the signal processor 114 post calibration, exhibits reduced gain mismatch as compared to the first plurality of constant-envelope signals 124.

The signal processor 114 may feed the second plurality of constant-envelope signals 142 to the first DAC 116A and the second DAC 116B, respectively. The first DAC 116A and the second DAC 116B may be configured to convert the second plurality of constant-envelope signals 142 into second plurality of constant-envelope analog signals 144. The first DAC 116A and the second DAC 116B may feed the first constant-envelope analog signal 144A and the second constant-envelope analog signal 144B of the second plurality of constant-envelope analog signals 144 to the first mixer 118A and the second mixer 118B, respectively.

The first mixer 118A and the second mixer 118B may be configured to up-convert the second plurality of constant-envelope analog signals 144 into the second plurality of RF signals 146. The first RF signal 146A and the second RF signal 146B of the second plurality of RF signals 146 are expressed in equations (2) and (3), as described in FIG. 1A.

The first mixer 118A and the second mixer 118B may feed the first RF signal 146A and the second RF signal 146B to the first PS 104A and the second PS 104B, respectively. The first PS 104A and the second PS 104B may further receive a feedback signal characteristic, such as a phase difference, from the first controller. The phase difference, corresponding to the first modulated input signal 122, may be determined by the first PD 110A and the second PD 110B, and provided to the first controller for calibration of the second plurality of signal characteristics, such as phase mismatch, that corresponds to the second plurality of RF signals 146. The second plurality of phase-shifted RF signals 148, thus generated by the first PS 104A and the second PS 104B post calibration, exhibits reduced phase mismatch as compared to the first plurality of RF signals 128.

The first PS 104A and the second PS 104B may be configured to feed the second plurality of phase-shifted RF signals 148 to the first PA 106A and the second PA 106B, respectively. The first PA 106A and the second PA 106B, with similar impedances, may be configured to amplify the second plurality of phase-shifted RF signals 148, and generate the second plurality of amplified RF signals 150. The second plurality of amplified RF signals 150, thus generated by the first PA 106A and the second PA 106B, exhibits reduced differences of a second plurality of signal characteristics, such as gain and/or phase mismatch, of the second plurality of amplified RF signals 150, as compared to the first plurality of signal characteristics of the first plurality of amplified RF signals 132.

The power combiner may be configured to reconstruct a second output RF signal based on a combination of the second plurality of amplified RF signals 150, received from the first PA 106A and the second PA 106B. The combination may correspond to a sum (and a difference) of the second plurality of amplified RF signals 150. In accordance with an embodiment, the combination of the second plurality of amplified RF signals 150 is expressed in equation (4), as described in FIG. 1A.

Thus, the outphasing calibration RF transmitter 100B may be configured to reduce the gain, phase, and/or outphasing mismatches between two decomposed signals based on calibration of second plurality of signal characteristics of the second plurality of constant-envelope signals. Consequently, the linearity of the first PA 106A and the second PA 106B is reduced and hence, increases the error vector magnitude (EVM) of the RF signal. Further, such reduction in the mismatch in gain and/or phase may correct the IQ imbalance of the RF signal, thus improving the signal quality of an output RF signal, such as the second output RF signal.

FIG. 2A illustrates a first exemplary embodiment of an exemplary outphasing calibration RF transmitter. With reference to FIG. 2A, there is shown a portion of the outphasing calibration RF transmitter 100A that includes the first PA 106A, the second PA 106B, and a differential antenna 112A. There is further shown a transformer in a power combiner of the outphasing calibration RF transmitter 100A. The transformer may include a first primary coil 202A, a second primary coil 202B, and a secondary coil 202C. The power combiner may further include the first load impedance 108A, the second load impedance 108B, the first PD 110A, the second PD 110B, and a TSSI 204.

The first primary coil 202A is coupled to the first PA 106A and the second primary coil 202B is coupled to the second PA 106B. The secondary coil 202C is coupled with the first primary coil 202A and the second primary coil 202B on one side, and with the differential antenna 112A on the other side. The first load impedance 108A is adjustable and coupled between first terminals of the first PA 106A and the second PA 106B. Similarly, the second load impedance 108B is adjustable and coupled between second terminals of the first PA 106A and the second PA 106B. It may be noted that in a first implementation of the first exemplary embodiment, as shown in FIG. 2A, the first terminals correspond to the positive terminals of the first PA 106A and the second PA 106B, and the second terminals correspond to the negative terminals of the first PA 106A and the second PA 106B. In a second implementation of the first exemplary embodiment, the first terminals correspond to the positive terminal of the first PA 106A and the negative terminal of the second PA 106B, and the second terminals correspond to the negative terminal of the first PA 106A and the positive terminal of the second PA 106B.

With reference to FIG. 2A, in accordance with the first implementation of the first exemplary embodiment, the first PA 106A receives the first RF signal 128A and generates the first amplified RF signal 132A. Similarly, the second PA 106B receives the second RF signal 128B and generates the second amplified RF signal 132B. Due to the first amplified RF signal 132A, a first current $I_1$ is generated across the output terminals of the first PA 106A. Similarly, due to the second amplified RF signal 132B, a second current $I_2$ is generated across the output terminals of the second PA 106B.

In accordance with the first implementation of the first exemplary embodiment, the first current $I_1$ is in-phase with the second current $I_2$. In other words, a first phase of the first amplified RF signal 132A in the first primary coil 202A is in the same direction with respect to a second phase of the second amplified RF signal 132B in the second primary coil 202B. In such a case, a current $I_3$ may be induced in the secondary coil 202C of the transformer. The secondary coil 202C may supply the current $I_3$ to the differential antenna 112A. Hence, the TSSI 204 may detect a difference of a first plurality of signal characteristics, such as voltage difference, of the first plurality of amplified RF signals 132 across the differential antenna 112A. At the same time, there is zero potential drop across the first terminals of the first PA 106A and the second PA 106B and the second terminals of the first PA 106A and the second PA 106B. Thus, no current is dissipated in the first load impedance 108A and the second load impedance 108B. Hence, the first PD 110A and the second PD 110B may not detect differences of a first plurality of signal characteristics, such as phase differences, of the first plurality of amplified RF signals 132 across the plurality of load impedances 108.

Thus, in accordance with the first implementation of the first exemplary embodiment, the TSSI 204 may be configured to communicate the detected difference of the first plurality of signal characteristics, i.e. the voltage difference, to the second controller, such as a modem. The second controller may be configured to control the signal processor 114 for the generation of the second plurality of constant-envelope signals 142 on the plurality of transmission paths. Thus, a first calibration of the second plurality of signal characteristics of the second plurality of constant-envelope signals 142 is executed to reduce the differences of the second plurality of signal characteristics of the second plurality of constant-envelope signals 142.

In accordance with the second implementation of the first exemplary embodiment, as described above, the first terminals correspond to the positive terminal of the first PA 106A and the negative terminal of the second PA 106B. Further, the second terminals correspond to the negative terminal of the first PA 106A and the positive terminal of the second PA 106B. In such an implementation, the first current $I_1$ is out-phased with the second current $I_2$. In other words, a first phase of the first amplified RF signal 132A in the first primary coil 202A is in the opposite direction with respect to a second phase of the second amplified RF signal 132B in the second primary coil 202B. In such a case, no current may be induced in the secondary coil 202C of the transformer. Thus, the secondary coil 202C may not supply any current to the differential antenna 112A. Hence, the TSSI 204 may not detect a difference of a first plurality of signal characteristics, such as voltage difference, of the first plurality of amplified RF signals 132 across the differential antenna 112A. At the same time (concurrently), there is a potential drop across the first terminals of the first PA 106A and the second PA 106B and the second terminals of the first PA 106A and the second PA 106B. Thus, the currents $I_1$ and $I_2$ are dissipated in the first load impedance 108A and the second load impedance 108B, respectively. Hence, the first PD 110A and the second PD 110B may detect differences of a first plurality of signal characteristics, such as phase differences, of the first plurality of amplified RF signals 132 across the plurality of load impedances 108.

Thus, in accordance with the second implementation of the first exemplary embodiment, the first PD 110A and the second PD 110B may be configured to communicate the detected difference of the first plurality of signal characteristics, i.e. the phase difference, to the first controller, such as a phase controller. The first controller may be configured to control the first PS 104A and the second PS 104B. The first PS 104A and the second PS 104B further control the second plurality of signal characteristics, such as a phase difference, of the second plurality of constant-envelope signals 142 on the plurality of transmission paths. Thus, a second calibration of the second plurality of signal characteristics of the second plurality of constant-envelope signals 142 is executed to reduce the differences of the second plurality of signal characteristics of the second plurality of constant-envelope signals 142.

FIG. 2B illustrates a second exemplary embodiment of an exemplary outphasing calibration RF transmitter. With reference to FIG. 2B, there is shown a portion of the outphasing calibration RF transmitter 100A that includes the first PA 106A, the second PA 106B, and a single-ended antenna 112B with one end connected to the ground. There is further shown the first primary coil 202A, the second primary coil 202B, and the secondary coil 202C in the transformer of a power combiner. The power combiner may further include the first load impedance 108A, the second load impedance 108B, the first PD 110A, and the second PD 110B. There is further shown the TSSI 204 coupled across the single-ended antenna 112B.

The first primary coil 202A is coupled to positive terminals of the first PA 106A and the second PA 106B. The second primary coil 202B is coupled to negative terminals of the first PA 106A and the second PA 106B. One end of the secondary coil 202C is coupled to the first primary coil 202A, the second primary coil 202B, and the single-ended antenna 112B. Other end of the secondary coil 202C is grounded. The first load impedance 108A is coupled between first terminals of the first PA 106A and the second PA 106B. Similarly, the second load impedance 108B is coupled between second terminals of the first PA 106A and the second PA 106B. It may be noted that in the first implementation of the second exemplary embodiment, as shown in FIG. 2B, the first terminals correspond to the positive terminal of the first PA 106A and the positive terminal of the second PA 106B, and the second terminals correspond to the negative terminal of the first PA 106A and the negative terminal of the second PA 106B. In a second implementation of the second exemplary embodiment, the first terminals correspond to the positive terminal of the first PA 106A and the negative terminal of the second PA 106B, and the second terminals correspond to the negative terminal of the first PA 106A and the positive terminal of the second PA 106B.

With reference to FIG. 2B, in accordance with the first implementation of the second exemplary embodiment, the first PA 106A receives the first RF signal 128A and generates the first amplified RF signal 132A. Similarly, the second PA 106B receives the second RF signal 128B and generates the second amplified RF signal 132B. Due to the first amplified RF signal 132A, a first current $I_1$ is generated across the output terminals of the first PA 106A. Similarly, due to the second amplified RF signal 132B, a second current $I_2$ is generated across the output terminals of the second PA 106B.

In accordance with the first implementation of the second exemplary embodiment, there is no potential drop across the first terminals of the first PA 106A and the second PA 106B and the second terminals of the first PA 106A and the second PA 106B. Thus, a current is not dissipated in the first load impedance 108A and the second load impedance 108B and consequently, the first current $I_1$ will flow through the first primary coil 202A and the second current $I_2$ (that is in-phase with the first current $I_1$) will flow through the second primary coil 202B. Hence, the first PD 110A and the second PD 110B may not detect differences of a first plurality of signal characteristics, such as phase differences, of the first plurality of amplified RF signals 132 across the plurality of load impedances 108. However, the third current $I_3$ is induced in the secondary coil 202C, and is supplied to the single-ended antenna 112B. Hence, the TSSI 204 may detect a difference of a first plurality of signal characteristics, such as voltage difference, of the first plurality of amplified RF signals 132 across the single-ended antenna 112B.

Thus, in accordance with the first implementation of the second exemplary embodiment, the TSSI 204 may be configured to communicate the detected difference of the first plurality of signal characteristics, i.e. the voltage difference, to the second controller, such as a modem. The second controller may be configured to control the signal processor 114 for the generation of the second plurality of constant-envelope signals 142 on the plurality of transmission paths. Thus, a first calibration of the second plurality of signal characteristics of the second plurality of constant-envelope signals 142 is executed to reduce the differences of the second plurality of signal characteristics of the second plurality of constant-envelope signals 142.

In accordance with the second implementation of the second exemplary embodiment, as described above, there is a potential drop across the first terminals of the first PA 106A and the second PA 106B and the second terminals of the first PA 106A and the second PA 106B. Thus, current is dissipated in the first load impedance 108A and the second load impedance 108B. Hence, the first PD 110A and the second PD 110B may detect differences of a first plurality of signal characteristics, such as phase differences, of the first plurality of amplified RF signals 132 across the plurality of load impedances 108. Consequently, no current will flow through the first primary coil 202A and the second primary coil 202B. In such implementation, no current is induced in the secondary coil 202C and thus, no current is supplied to the single-ended antenna 112B. Hence, the TSSI 204 may not detect a difference of a first plurality of signal characteristics, such as voltage difference, of the first plurality of amplified RF signals 132 across the single-ended antenna 112B.

Thus, in accordance with the second implementation of the second exemplary embodiment, the first PD 110A and the second PD 110B may be configured to communicate the detected difference of the first plurality of signal characteristics, i.e. the phase difference, to the first controller, such as a phase controller. The first controller may be configured to control the first PS 104A and the second PS 104B. The first PS 104A and the second PS 104B further control the second plurality of signal characteristics of the second plurality of constant-envelope signals 142 on the plurality of transmission paths. Thus, a second calibration of the second plurality of signal characteristics of the second plurality of constant-envelope signals 142 is executed to reduce the differences of the second plurality of signal characteristics of the second plurality of constant-envelope signals 142.

FIG. 2C illustrates a third exemplary embodiment of an exemplary outphasing calibration RF transmitter. With reference to FIG. 2C, there is shown a portion of the outphasing calibration RF transmitter 100A that includes the first PA 106A, the second PA 106B, and a polarized antenna 112C. The power combiner may further include a first transformer 206 and a second transformer 208. The first transformer 206 may include a primary coil 206A and a secondary coil 206B. Similarly, the second transformer 208 may include a primary coil 208A and a secondary coil 208B. The polarized antenna 112C includes a first pair of polarized ports and a second pair of polarized ports. The first TSSI unit 120A is coupled across the first pair of polarized ports and the second TSSI unit 120B is coupled across the second pair of polarized ports. The first pair of polarized ports is coupled with the secondary coil 206B of the first transformer 206. The second pair of polarized ports is coupled to the secondary coil 208B of the second transformer 208. There is further shown a first load impedance 108A and a second load impedance 108B. The first load impedance 108A is coupled to the first terminals of the secondary coil 206B and the secondary coil 208B. The second load impedance 108B is coupled to the second terminals of the secondary coil 206B and the secondary coil 208B. In accordance with a first implementation of the third exemplary embodiment, the first terminals correspond to the positive terminals of the secondary coil 206B and the secondary coil 208B. Further, the second terminals correspond to the negative terminals of the secondary coil 206B and the secondary coil 208B. In accordance with a second implementation of the third exemplary embodiment, the first terminals correspond to the positive terminal of the secondary coil 206B and the negative terminal of the secondary coil 208B. Further, the second terminals correspond to the negative terminal of the secondary coil 206B and the positive terminal of the secondary coil 208B.

With reference to FIG. 2C, in accordance with the first implementation of the third exemplary embodiment, the first PA 106A receives the first RF signal 128A and generates the first amplified RF signal 132A. Similarly, the second PA 106B receives the second RF signal 128B and generates the second amplified RF signal 132B. Due to the first amplified RF signal 132A, a first current $I_{P1}$ is generated across the output terminals of the first PA 106A. Similarly, due to the second amplified RF signal 132B, a second current $I_{P2}$ is generated across the output terminals of the second PA 106B.

In accordance with the first implementation of the third exemplary embodiment, the first current $I_{P1}$ in the primary coil 206A is in-phase with the second current $I_{P2}$ in the primary coil 208A. In other words, a first phase of the first amplified RF signal 132A in the primary coil 206A is in the same direction with respect to a second phase of the second amplified RF signal 132B in the primary coil 208A. In such a case, a current $I_{S1}$ may be induced in the secondary coil 206B of the first transformer 206 and a current $I_{S2}$ may be induced in the secondary coil 208B of the second transformer 208. Consequently, there are no potential drops across the first load impedance 108A and the second load impedance 108B. Thus, the currents $I_{S1}$ and $I_{S2}$ are not dissipated across the first load impedance 108A and the second load impedance 108B and the currents $I_{S1}$ and $I_{S2}$ are supplied to the polarized antenna 112C. Hence, the first TSSI unit 120A and the second TSSI unit 120B may detect difference of a first plurality of signal characteristics, such as voltage differences, of the first plurality of amplified RF signals 132 across the first pair of polarized ports and the second pair of polarized ports of the polarized antenna 112C.

Thus, in accordance with the first implementation of the third exemplary embodiment, the first TSSI unit 120A and the second TSSI unit 120B may be configured to communicate the detected differences of the first plurality of signal characteristics, i.e. the voltage differences, to the second controller, such as a modem. The second controller may be configured to control the signal processor 114 for the generation of the second plurality of constant-envelope signals 142 on the plurality of transmission paths. Thus, a first calibration of the second plurality of signal characteristics of the second plurality of constant-envelope signals 142 is executed to reduce the differences of the second plurality of signal characteristics of the second plurality of constant-envelope signals 142.

In accordance with the second implementation of the third exemplary embodiment, as described above, the first current $I_{P1}$ is outphased with the second current $I_{P2}$. In other words, a first phase of the first amplified RF signal 132A in the primary coil 206A is in the opposite direction with respect to a second phase of the second amplified RF signal 132B in the secondary coil 208B. In such a case, the current $I_{S1}$ may be induced in the secondary coil 206B of the first transformer 206 and a current $I_{S2}$ may be induced in the secondary coil 208B of the second transformer 208. Consequently, there are potential drops across the first load impedance 108A and the second load impedance 108B. Thus, the currents $I_{S1}$ and $I_{S2}$ are dissipated across the first load impedance 108A and the second load impedance 108B and the currents $I_{S1}$ and $I_{S2}$ are not supplied to the polarized antenna 112C. Hence, the first PD 110A and the second PD 110B may detect differences of a first plurality of signal characteristics, such as phase differences, of the first plurality of amplified RF signals 132 across the plurality of load impedances 108.

Thus, in accordance with the second implementation of the third exemplary embodiment, the first PD 110A and the second PD 110B may be configured to communicate the detected difference of the first plurality of signal characteristics, i.e. the phase difference, to the first controller, such as a phase controller. The first controller may be configured to control the first PS 104A and the second PS 104B. The first PS 104A and the second PS 104B further control the second plurality of signal characteristics of the second plurality of constant-envelope signals 142 on the plurality of transmission paths. Thus, a second calibration of the second plurality of signal characteristics of the second plurality of constant-envelope signals 142 is executed to reduce the differences of the second plurality of signal characteristics of the second plurality of constant-envelope signals 142.

FIG. 2D illustrates a fourth exemplary embodiment of an exemplary outphasing calibration RF transmitter. With reference to FIG. 2D, there is shown a portion of the outphasing calibration RF transmitter 100A that includes the first PA 106A, the second PA 106B, and the polarized antenna 112C. The power combiner may further include the first load impedance 108A and the second load impedance 108B. The polarized antenna 112C includes a first pair of polarized ports and a second pair of polarized ports. A first TSSI unit 120A is coupled across the first pair of polarized ports and a second TSSI unit 120B is coupled across the second pair of polarized ports. The first pair of polarized ports is coupled with the first PA 106A. The second pair of polarized ports is coupled to the second PA 106B.

The first load impedance 108A is coupled to the first terminals of the first PA 106A and the second PA 106B. The second load impedance 108B is coupled to the second terminals of the first PA 106A and the second PA 106B. In accordance with a first implementation of the fourth exemplary embodiment, the first terminals correspond to the positive terminals of the first PA 106A and the second PA 106B. Further, the second terminals correspond to the negative terminals of the first PA 106A and the second PA 106B. In accordance with a second implementation of the fourth exemplary embodiment, the first terminals correspond to the positive terminal of the first PA 106A and the negative terminal of the second PA 106B. Further, the second terminals correspond to the negative terminal of the first PA 106A and the positive terminal of the second PA 106B.

With reference to FIG. 2D, in accordance with the first implementation of the fourth exemplary embodiment, the first PA 106A receives the first RF signal 128A and generates the first amplified RF signal 132A. Similarly, the second PA 106B receives the second RF signal 128B and generates the second amplified RF signal 132B. Due to the first amplified RF signal 132A, a first current $I_1$ is generated across the output terminals of the first PA 106A. Similarly, due to the second amplified RF signal 132B, a second current $I_2$ is generated across the output terminals of the second PA 106B.

In accordance with the first implementation of the fourth exemplary embodiment, when currents $I_1$ and $I_2$ are in-phase, there are no potential drops across the first load impedance 108A and the second load impedance 108B. Thus, the currents $I_1$ and $I_2$ are not dissipated across the first load impedance 108A and the second load impedance 108B and the currents $I_1$ and $I_2$ are supplied to the polarized antenna 112C. Hence, the first TSSI unit 120A and the second TSSI unit 120B may detect difference of a first plurality of signal characteristics, such as voltage difference, of the first plurality of amplified RF signals 132 across the first pair of polarized ports and the second pair of polarized ports of the polarized antenna 112C.

Thus, in accordance with the first implementation of the fourth exemplary embodiment, the first TSSI unit 120A and the second TSSI unit 120B may be configured to communicate the detected difference of the first plurality of signal characteristics, i.e. the voltage difference, to the second controller, such as a modem. The second controller may be configured to control the signal processor 114 for the generation of the second plurality of constant-envelope signals 142 on the plurality of transmission paths. Thus, a first calibration of the second plurality of signal characteristics of the second plurality of constant-envelope signals 142 is executed to reduce the differences of the second plurality of signal characteristics of the second plurality of constant-envelope signals 142.

In accordance with the second implementation of the fourth exemplary embodiment, as described above, when currents $I_1$ and $I_2$ are outphased, there are potential drops across the first load impedance 108A and the second load impedance 108B. Thus, the currents $I_1$ and $I_2$ are dissipated across the first load impedance 108A and the second load impedance 108B and the currents $I_1$ and $I_2$ are not supplied to the polarized antenna 112C. Hence, the first PD 110A and the second PD 110B may detect differences of a first plurality of signal characteristics, such as phase differences, of the first plurality of amplified RF signals 132 across the plurality of load impedances 108.

Thus, in accordance with the second implementation of the fourth exemplary embodiment, the first PD 110A and the second PD 110B may be configured to communicate the detected difference of the first plurality of signal characteristics, i.e. the phase difference, to the first controller, such as a phase controller. The first controller may be configured to control the first PS 104A and the second PS 104B. The first PS 104A and the second PS 104B further control the second plurality of signal characteristics of the second plurality of constant-envelope signals 142 on the plurality of transmission paths. Thus, a second calibration of the second plurality of signal characteristics of the second plurality of constant-envelope signals 142 is executed to reduce the differences of the second plurality of signal characteristics of the second plurality of constant-envelope signals 142.

Figure 3:
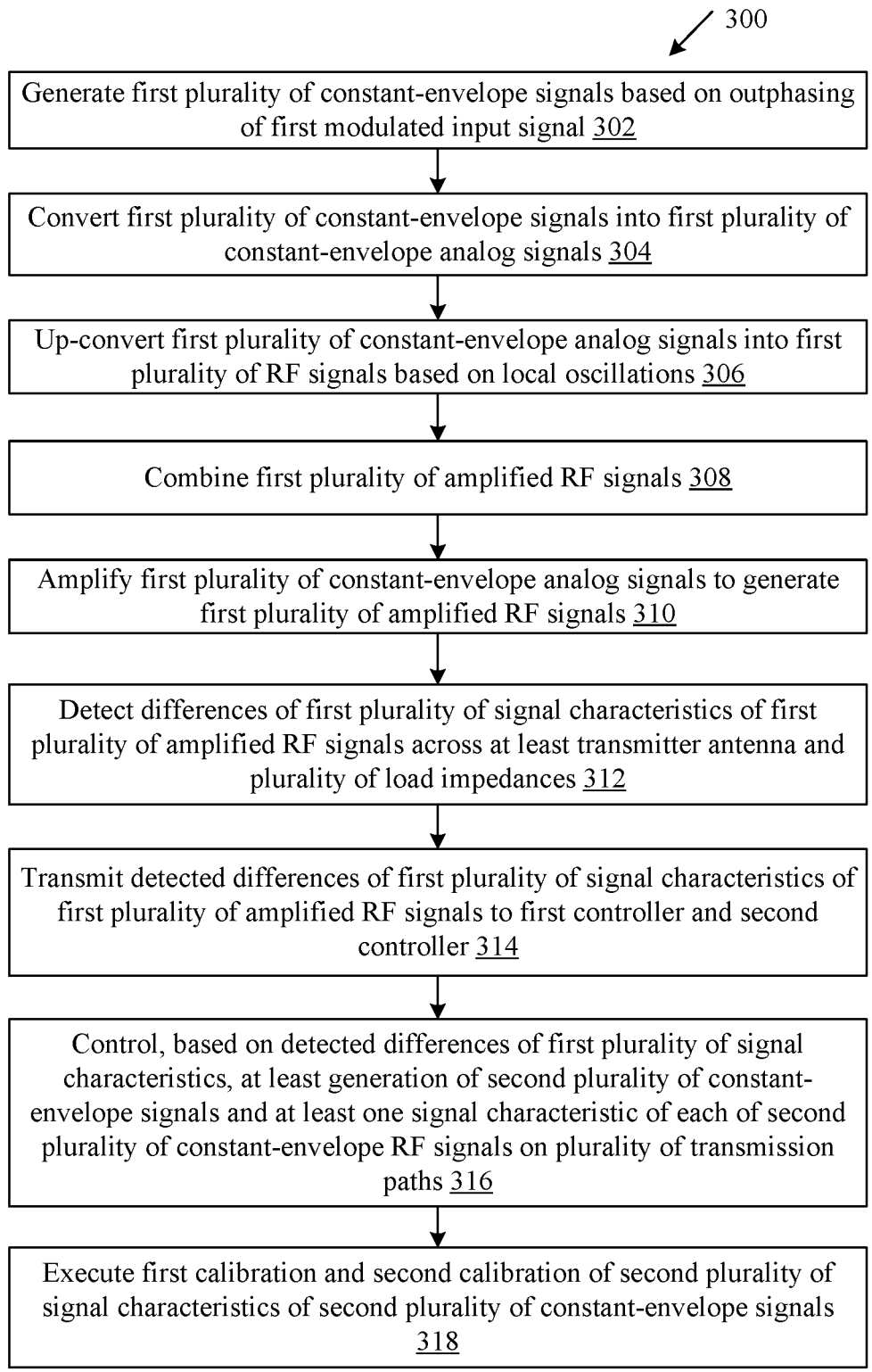
FIG. 3 depicts a flow chart illustrating exemplary operations for an exemplary outphasing calibration RF transmitter of FIGS. 1A and 1B, in accordance with an exemplary embodiment of the disclosure.

FIG. 3 depicts a flow chart illustrating exemplary operations for an exemplary outphasing calibration RF transmitter of FIGS. 1A and 1B, in accordance with an exemplary embodiment of the disclosure. Referring to FIG. 3, there is shown a flow chart 300 comprising exemplary operations 302 through 318.

At 302, a first plurality of constant-envelope signals may be generated. In accordance with an embodiment, the signal processor 114 in the signal decomposition block 102 may be configured to generate the first plurality of constant-envelope signals 124 based on outphasing (or decomposition) of the first modulated input signal 122. The first modulated input signal 122 may be a modulated signal with variable amplitude received from a modem, for example. The first plurality of constant-envelope signals 124, thus generated, may have a single constant amplitude level.

At 304, the first plurality of constant-envelope signal may be converted into a first plurality of constant-envelope analog signals. In accordance with an embodiment, the first DAC 116A and the second DAC 116B may be configured to convert the first plurality of constant-envelope signals 124 into first plurality of constant-envelope analog signals 126. The first DAC 116A and the second DAC 116B may feed the first constant-envelope analog signal 126A and the second constant-envelope analog signal 126B of the first plurality of constant-envelope analog signals 126 to the first mixer 118A and the second mixer 118B, respectively.

At 306, the first plurality of constant-envelope analog signals may be up-converted into a first plurality of RF signals. In accordance with an embodiment, the first mixer 118A and the second mixer 118B may be configured to up-convert the first plurality of constant-envelope analog signals 126 into the first plurality of RF signals 128 based on local oscillations generated by a local oscillator. The first RF signal 128A and the second RF signal 128B of the first plurality of RF signals 128 are expressed in equations (2) and (3), as described in FIG. 1A.

At 308, the first plurality of RF signals may be amplified. In accordance with an embodiment, the first PA 106A and the second PA 106B, with similar impedances, may be configured to amplify the first plurality of RF signals 128, and generate the first plurality of amplified RF signals 132. The first PA 106A and the second PA 106B may be placed sufficiently apart from each other and provided respective RF shields for minimization of inter-modulation or interference between the first PA 106A and the second PA 106B.

In accordance with an embodiment, prior to the amplification, phase shifting may be performed on the first plurality of RF signals 128 to control phase difference between the first plurality of RF signals 128. Such phase shifting on the first plurality of RF signals 128 is performed based on external factors, such as system configuration or manual setting. The phase shifting of the first plurality of RF signals 128 is not based on previous signals. Thus, this step may be an optional step for the first plurality of RF signals 128.

At 310, the first plurality of amplified RF signals 132 may be combined. In accordance with an embodiment, the power combiner may be configured to reconstruct a first output RF signal based on a combination of the first plurality of amplified RF signals 132, received from the first PA 106A and the second PA 106B. The combination may correspond to a sum (and a difference) of the first plurality of amplified RF signals 132. In accordance with an embodiment, the combination of the first plurality of amplified RF signals 132 is expressed in equation (4), as described in FIG. 1B.

At 312, differences of a first plurality of signal characteristics of the first plurality of amplified RF signals may be detected. The differences may be detected by one or more electronic components based on in-phased or out-phased currents generated across the first PA 106A and the second PA 106B. In accordance with an embodiment, when the currents are dissipated in the first load impedance 108A and the second load impedance 108B (for example, in accordance with the second implementation of the first exemplary embodiment (FIG. 2A)), the first PD 110A and the second PD 110B may be configured to detect differences of a first signal characteristic, such as a phase difference, across the first load impedance 108A and the second load impedance 108B.

In accordance with another embodiment, when the currents are dissipated in the differential antenna 112A (for example, in accordance with the first implementation of the first exemplary embodiment (FIG. 2A)), the TSSI 204 may be configured to detect differences of a first signal characteristic, such as a voltage difference, across the differential antenna 112A.

At 314, detected differences of the first plurality of signal characteristics of the first plurality of amplified signals may be transmitted. In accordance with an embodiment, the first PD 110A and the second PD 110B may be configured to transmit the detected phase difference to a first controller (not shown), such as a phase controller, to control a phase difference of next modulated input signal, such as the second modulated input signal 140. In accordance with another embodiment, the TSSI 204 may be configured to transmit the detected phase difference to a second controller (not shown), such as a modem, to control a gain difference of next modulated input signal, such as the second modulated input signal 140.

At 316, based on the detected differences of the first plurality of signal characteristics, at least a generation of a second plurality of constant-envelope signals and at least one signal characteristic of each of a second plurality of constant-envelope RF signals on the plurality of transmission paths may be controlled. In accordance with an embodiment, the first controller may be configured to control the first PS 104A and the second PS 104B. The first PS 104A and the second PS 104B further control the second plurality of signal characteristics of the second plurality of constant-envelope signals 142 on the plurality of transmission paths. In accordance with another embodiment, the second controller may be configured to control the signal processor 114 for the generation of the second plurality of constant-envelope signals 142 on the plurality of transmission paths.

At 318, at least one of the first calibration and a second calibration of the second plurality of signal characteristics of the second plurality of constant-envelope signals may be executed. In accordance with an embodiment, at least one of the first calibration and the second calibration of the second plurality of signal characteristics of the second plurality of constant-envelope signals 142 is executed to reduce the differences of the second plurality of signal characteristics of the second plurality of constant-envelope signals 142.

Thus, the outphasing calibration RF transmitter 100B may be configured to reduce the gain, phase, and/or outphasing mismatches between two decomposed signals based on calibration of second plurality of signal characteristics of the second plurality of constant-envelope signals 142. Consequently, the linearity of the first PA 106A and the second PA 106B is reduced and hence, increases the error vector magnitude (EVM) of the second output RF signal. Further, such reduction in the mismatch in gain and/or phase may correct the IQ imbalance of the second output RF signal, thus improving the signal quality of the second output RF signal.

While various embodiments described in the present disclosure have been described above, it should be understood that they have been presented by way of example, and not limitation. It is to be understood that various changes in form and detail can be made therein without departing from the scope of the present disclosure. In addition to using hardware (e.g., within or coupled to a central processing unit ("CPU" or processor), microprocessor, micro controller, digital signal processor, processor core, system on chip ("SOC") or any other device), implementations may also be embodied in software (e.g. computer readable code, program code, and/or instructions disposed in any form, such as source, object or machine language) disposed for example in a non-transitory computer-readable medium configured to store the software. Such software can enable, for example, the function, fabrication, modeling, simulation, description and/or testing of the apparatus and methods describe herein. For example, this can be accomplished through the use of general program languages (e.g., C, C++), hardware description languages (HDL) including Verilog HDL, VHDL, and so on, or other available programs. Such software can be disposed in any known non-transitory computer-readable medium, such as semiconductor, magnetic disc, or optical disc (e.g., CD-ROM, DVD-ROM, etc.). The software can also be disposed as computer data embodied in a non-transitory computer-readable transmission medium (e.g., solid state memory any other non-transitory medium including digital, optical, analogue-based medium, such as removable storage media). Embodiments of the present disclosure may include methods of providing the apparatus described herein by providing software describing the apparatus and subsequently transmitting the software as a computer data signal over a communication network including the internet and intranets.

It is to be further understood that the system described herein may be included in a semiconductor intellectual property core, such as a microprocessor core (e.g., embodied in HDL) and transformed to hardware in the production of integrated circuits. Additionally, the system described herein may be embodied as a combination of hardware and software. Thus, the present disclosure should not be limited by any of the above-described exemplary embodiments, but should be defined only in accordance with the following claims and their equivalents.

What is claimed is:

1. A method, comprising:
    in a radio frequency (RF) transmitter:
        detecting, by a plurality of circuits, differences of a first plurality of signal characteristics of a first plurality of amplified RF signals across at least a transmitter antenna and a plurality of load impedances,
        wherein the first plurality of amplified RF signals corresponds to a first plurality of constant-envelope signals;
        controlling, by the plurality of circuits, based on the detected differences of the first plurality of signal characteristics, at least a generation of a second plurality of constant-envelope signals and at least one signal characteristic of each of a second plurality of constant-envelope RF signals on a plurality of transmission paths; and
        calibrating, by the plurality of circuits, a second plurality of signal characteristics of the second plurality of constant-envelope signals based on the controlled generation of the second plurality of constant-envelope signals and the at least one controlled signal characteristic of each of the second plurality of constant-envelope RF signals.

2. The method according to claim 1, further comprising generating, by the plurality of circuits, the first plurality of constant-envelope signals and the second plurality of constant-envelope signals based on a first modulated input signal and a second modulated input signal,
    wherein the first plurality of constant-envelope signals and the second plurality of constant-envelope signals correspond to digital signals with constant amplitudes.

3. The method according to claim 2,
    wherein the first modulated input signal and the second modulated input signal are associated with variable amplitudes,
    wherein phases of at least two signals in the first plurality of constant-envelope signals and the second plurality of constant-envelope signals are in opposite directions, and
    wherein the transmitter antenna corresponds to at least one of a polarized antenna, a differential antenna, or a single-ended antenna.

4. The method according to claim 1, further comprising converting, by the plurality of circuits, the first plurality of constant-envelope signals into a first plurality of constant-envelope analog signals and the second plurality of constant-envelope signals into a second plurality of constant-envelope analog signals.

5. The method according to claim 4, further comprising up-converting, by the plurality of circuits, the first plurality of constant-envelope analog signals into a first plurality of RF signals and the second plurality of constant-envelope analog signals into a second plurality of RF signals, based on local oscillations.

6. The method according to claim 5, further comprising phase-shifting, by the plurality of circuits, the at least one signal characteristic of each of the second plurality of RF signals with a defined value to generate a second plurality of phase-shifted RF signals.

7. The method according to claim 6, further comprising amplifying, by the plurality of circuits, at least the second plurality of phase-shifted RF signals to generate at least a second plurality of amplified RF signals.

8. The method according to claim 1, wherein the transmitter antenna is configured to transmit a first output RF signal and a second output RF signal to an RF receiver,
    wherein the transmitted first output RF signal corresponds to first combined signals corresponding to the first plurality of amplified RF signals and the second output RF signal corresponds to second combined signals corresponding to a second plurality of amplified RF signals.

9. The method according to claim 1, further comprising storing, by the plurality of circuits, the detected differences of the first plurality of signal characteristics of the first plurality of amplified RF signals in a memory device.

10. The method according to claim 9, further comprising retrieving, by the plurality of circuits, the stored differences of the first plurality of signal characteristics of the first plurality of amplified RF signals from the memory device to control the at least one signal characteristic of each of a second plurality of amplified RF signals.

11. The method according to claim 1, wherein the first plurality of signal characteristics and the second plurality of signal characteristics comprise at least a phase value, a gain value, a value, or a voltage value corresponding to each of the first plurality of amplified RF signals and a second plurality of amplified RF signals.

12. The method according to claim 1, wherein, based on the calibration, a first signal quality value associated with a first output RF signal that corresponds to a second plurality of amplified RF signals exceeds a second signal quality value associated with a second output RF signal that corresponds to the first plurality of amplified RF signals.

13. A radio frequency (RF) transmitter, comprising:
    a first load impedance and a second load impedance coupled across a first power amplifier (PA) and a second PA, wherein the first load impedance and the second load impedance are configured to receive currents generated based on voltage drops across the first PA and the second PA;
    a first phase detector and a second phase detector coupled across the first load impedance and the second load impedance,
    wherein the first phase detector and the second phase detector are configured to detect difference of a first signal characteristic of one or more signal characteristics of a first plurality of amplified RF signals across the first load impedance and the second load impedance;
    a transmitter signal strength indicator (TSSI) circuit coupled across a transmitter antenna, wherein the TSSI circuit is configured to detect difference of a second signal characteristic of the one or more signal characteristics of the first plurality of amplified RF signals across the transmitter antenna,
    wherein the first plurality of amplified RF signals corresponds to a first plurality of constant-envelope signals; and a signal processing circuit and a plurality of phase shifters, coupled to the TSSI circuit, the first phase detector, and the second phase detector, wherein the signal processing circuit and a plurality of phase shifters are configured to calibrate the one or more signal characteristics of a second plurality of amplified RF signals based on a controlled generation of a second plurality of constant-envelope signals and at least a controlled signal characteristic of each of the second plurality of constant-envelope signals.

14. The RF transmitter according to claim 13, wherein the signal processing circuit is configured to generate the first plurality of constant-envelope signals and the second plurality of constant-envelope signals based on a first modulated input signal and a second modulated input signal, and wherein the first plurality of constant-envelope signals and the second plurality of constant-envelope signals correspond to digital signals with constant amplitudes.

15. The RF transmitter according to claim 14, wherein a digital-to-analog converter is configured to convert the first plurality of constant-envelope signals into a first plurality of constant-envelope analog signals and the second plurality of constant-envelope signals into a second plurality of constant-envelope analog signals.

16. The RF transmitter according to claim 15, wherein a frequency mixer is configured to up-convert the first plurality of constant-envelope analog signals into a first plurality of constant-envelope RF signals and the second plurality of constant-envelope analog signals into a second plurality of constant-envelope RF signals, based on local oscillations.

17. The RF transmitter according to claim 13, wherein a phase shifter is configured to phase-shift at least the controlled signal characteristic of each of the second plurality of amplified RF signals with a defined value to generate a second plurality of phase-shifted RF signals.

18. The RF transmitter according to claim 17, wherein the first PA and the second PA are configured to amplify at least the phase-shifted second plurality of RF signals to generate at least the second plurality of amplified RF signals.

19. The RF transmitter according to claim 13, wherein the transmitter antenna is configured to transmit a first output RF signal and a second output RF signal to a RF receiver, wherein the transmitted first output RF signal corresponds to first combined signals corresponding to the first plurality of amplified RF signals and the second output RF signal corresponds to second combined signals corresponding to the second plurality of amplified RF signals.

20. The RF transmitter according to claim 13, wherein a memory device is configured to store the detected differences of the first signal characteristic and the second signal characteristic of the first plurality of amplified RF signals.

21. The RF transmitter according to claim 20, wherein a plurality of circuits are configured to retrieve the stored differences of the first signal characteristic and the second signal characteristic of the first plurality of amplified RF signals from the memory device to control at least the controlled signal characteristic of each of the second plurality of amplified RF signals.

22. A non-transitory computer-readable medium having stored thereon, computer executable instruction that when executed by a computer, cause the computer to execute instructions, comprising: in a radio frequency (RF) transmitter:

detecting, by a plurality of circuits, differences of a first plurality of signal characteristics of a first plurality of amplified RF signals across at least a transmitter antenna and a plurality of load impedances, wherein the first plurality of amplified RF signals correspond to a first plurality of constant-envelope signals;

controlling, by the plurality of circuits, based on the detected differences of the first plurality of signal characteristics, at least a generation of a second plurality of constant-envelope signals and at least one signal characteristic of each of a second plurality of constant-envelope RF signals on a plurality of transmission paths; and calibrating, by the plurality of circuits, a second plurality of signal characteristics of the second plurality of constant-envelope signals based on the controlled generation of the second plurality of constant-envelope signals and the at least one controlled signal characteristic of each of the second plurality of constant-envelope signals.

* * * * *